(12) United States Patent
Barbu et al.

(10) Patent No.: US 7,783,097 B2
(45) Date of Patent: Aug. 24, 2010

(54) SYSTEM AND METHOD FOR DETECTING A THREE DIMENSIONAL FLEXIBLE TUBE IN AN OBJECT (75) Inventors: Adrian Barbu, Plainsboro, NJ (US); Luca Bogoni, Philadelphia, PA (US); Dorin Comaniciu, Princeton Junction, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 805 days.

(21) Appl. No.: 11/733,287

(22) Filed: Apr. 10, 2007

(65) Prior Publication Data
US 2008/0044071 A1 Feb. 21, 2008

Related U.S. Application Data (60) Provisional application No. 60/792,524, filed on Apr. 17, 2006.

(51) Int. Cl.
G06K 9/00 (2006.01)
G06K 9/32 (2006.01)

(52) U.S. Cl. .................. 382/128; 382/131; 382/132; 382/294; 382/224; 600/407; 600/410; 600/425; 378/4

(58) Field of Classification Search ......... 382/128–132, 382/294, 224–228
See application file for complete search history.

(56) References Cited

U.S. PATENT DOCUMENTS

| 6,643,533 | B2* | 11/2003 | Knoplioch et al. ......... 600/407 |
| 6,970,594 | B2* | 11/2005 | Williams .................... 382/154 |
| 7,203,669 | B2* | 4/2007 | Lienhart et al. .............. 706/48 |
| 7,260,259 | B2* | 8/2007 | Comaniciu et al. ......... 382/173 |
| 7,640,050 | B2* | 12/2009 | Glenn et al. ................ 600/407 |
| 2005/0018890 | A1* | 1/2005 | McDonald et al. ......... 382/128 |
| 2006/0074934 | A1* | 4/2006 | Dettinger et al. ........... 707/100 |
| 2007/0071313 | A1* | 3/2007 | Zhou et al. ................. 382/155 |
| 2009/0169067 | A1* | 7/2009 | Chang et al. ............... 382/118 |

OTHER PUBLICATIONS

Zhuowen Tu, Probabilistic boosting tree—Clustering, IEEE, 1550-5499/05, 2005, 1-8 pages.*
Zhuowen et al. Probabilistic 3D polyp detection in CT images, IEEE, 2006, 0-7695-2597-0/06, 1-8 pages.*
Gheorghe et al. Reduction of false positives on rectal tube in—Colonography, Med Phys, 0094-2405/31(10)2855/8, Oct. 2004, pp. 2855-2862.*

* cited by examiner

Primary Examiner—Samir A. Ahmed
Assistant Examiner—Jayesh Patel (57) ABSTRACT

The present invention is directed to a system and method for populating a database with a set of image sequences of an object. The database is used to detect a tubular structure in the object. A set of images of objects are received in which each image is annotated to show a tubular structure. For each given image, a Probabilistic Boosting Tree (PBT) is used to detect three dimensional (3D) circles. Short tubes are constructed from pairs of approximately aligned 3D circles. A discriminative joint shape and appearance model is used to classify each short tube. A long flexible tube is formed by connecting all of the short tubes. A tubular structure model that comprises a start point, end point and the long flexible tube is identified. The tubular structure model is stored in the database.

12 Claims, 7 Drawing Sheets

SYSTEM AND METHOD FOR DETECTING A THREE DIMENSIONAL FLEXIBLE TUBE IN AN OBJECT

CROSS REFERENCE TO RELATED APPLICATION

This application claims the benefit of U.S. Provisional Application Ser. No. 60/792,524, filed Apr. 17, 2006 which is incorporated by reference in its entirety.

FIELD OF THE INVENTION

The present invention is directed to a system and method for detecting tubular structures using hierarchical modeling, and more particularly, to a system and method for detecting and tracking a flexible tube in an object.

BACKGROUND OF THE INVENTION

Prevention of colon cancer can be achieved by detecting and surgically removing the polyps from the colon wail. However, the colonoscopy procedure used for detecting the polyps is a time consuming procedure that produces great discomfort for the patient. Virtual colonoscopy is an increasingly popular alternative in which the patient's colon is inflated with air through a rectal tube and then one or two Computed Tomography (CT) scans of the abdomen are performed. A polyp detection method is used on the CT scans and the detection, results are reported to the doctor for inspection. The current polyp detection methods exhibit a relatively large numbers of false positives due to the rectal tube used to inflate the colon. Those false positives can be reduced by detecting and segmenting the rectal tube and discarding any potential positives that are close to the rectal tube.

Figure 1:
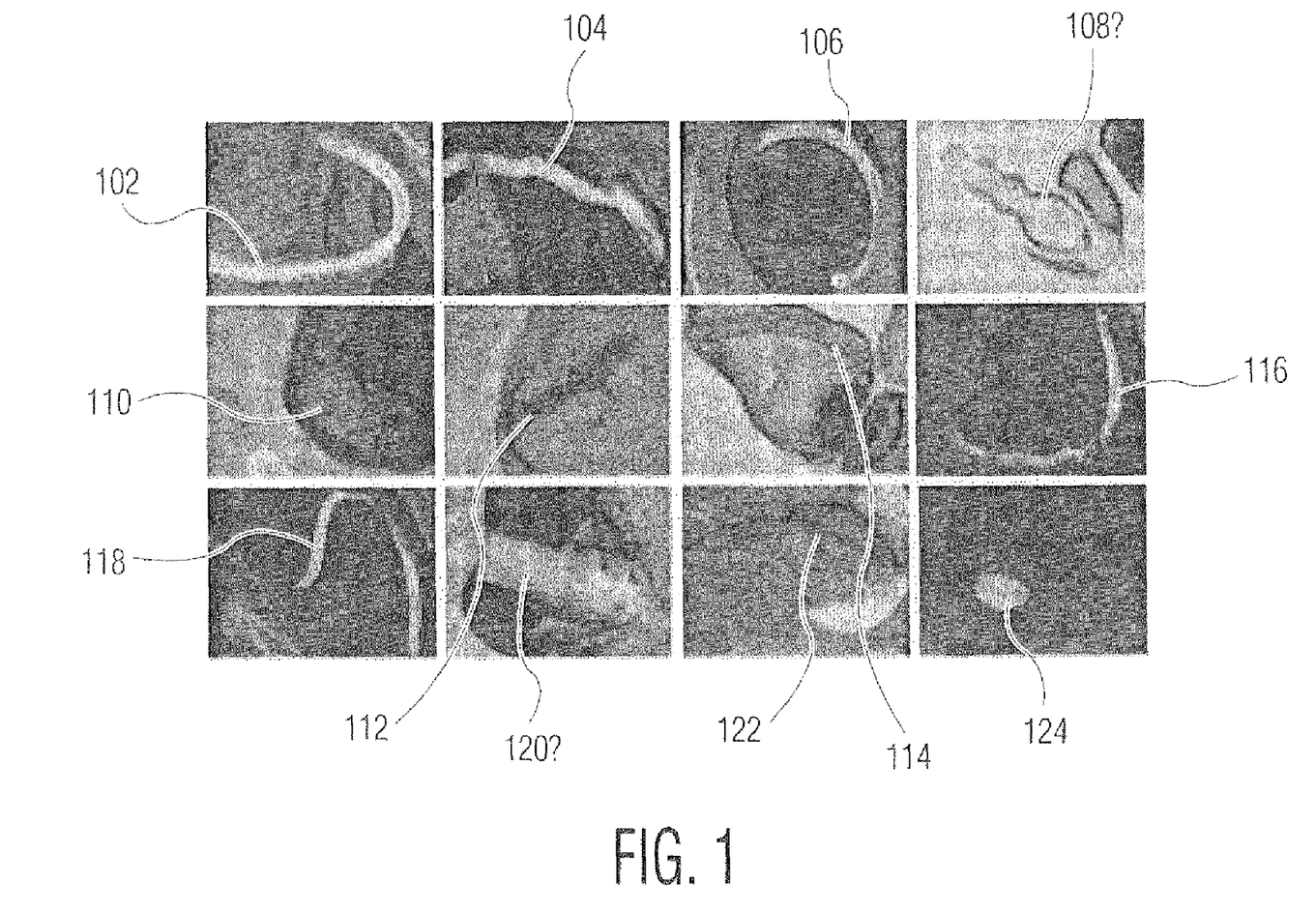
FIG. 1 illustrates a set of example frames of computed tomography images that display a rectal tube.

A rectal tube detection method should be fast and have a very low false positive rate, since false positives can decrease the detection rate of the overall polyp detection system. A known method for rectal tube detection handles the appearance by template matching, which is a relatively rigid method for detection, and the shape variability by tracking 2-dimensional (2D) slices. The tracking assumes that the tube is relatively perpendicular to one of the axes, which is often not true as shown in FIG. 1. FIG. 1 illustrates that the rectal tubes 102-124 are flexible and variable shape and appearance. The method only handles two types of rectal tubes and was validated on a relatively small number of cases (i.e., 80 datasets). The method also involved a large amount of potentially time consuming morphological operations such as region growing.

Another known method for reducing false positives due to rectal tubes involves using a Massive Trained Artificial Neural Network (MTANN) to distinguish between polyps and rectal tubes which raise questions about the degree of control of the generalization power of the system. There is a need for a method for detecting flexible tubes in an object that provides a large degree of control against overfitting the data.

SUMMARY OF THE INVENTION

The present invention is directed to a system and method for populating a database with a set of image sequences of an object. The database is used to detect a tubular structure in the object. A set of images of objects are received in which each image is annotated to show a tubular structure. For each given image, a Probabilistic Boosting Tree (PBT) is used to detect three dimensional (3D) circles. Short tubes are constructed from pairs of approximately aligned 3D circles. A discriminative joint shape and appearance model is used to classify each short tube. A long flexible tube is formed by connecting all of the short tubes. A tubular structure model that comprises a start point, end point and the long flexible tube is identified. The tubular structure model is stored in the database.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a learning-based method for detecting and segmenting 3D free-form flexible tubular structures, such as the rectal tubes using in CT colonoscopy. This method can be used to reduce the false positives introduced by rectal tubes in current polyp detection approaches. The method is hierarchical and detects parts of the tube in increasing order of complexity, from tube cross sections and tube segments to the entire flexible tube. The method uses a voting strategy to select candidate tube parts and increase the speed of the method. The detected tube segments are combined into a flexible tube using a dynamic programming algorithm. The present invention will be described in the context of detecting flexible rectal tubes used for colonoscopy procedures but it is to be understood by those skilled in the art that the method can be easily retrained to detect and segment other tubular 3D structures, such as airways and vasculature as well as stents and other similar medical implants.

The input to the system is a 512×512×N, where N could range between 400 and 1200, isometric CT volume and a set of query locations that are the output, of a first stage of a polyp detection. A label "RT" or "non-RT" is assigned to each query location stating whether the query location is at most at a specified distance from a rectal tube or not, e.g. 5 mm. The queries labeled as "non-RT" are passed through a second stage of polyp detection using a more involved algorithm and the remaining locations are reported to the physician as detected polyps.

For each CT volume, there are a number of query locations as input to the rectal tube detector. Of those, about 80% are automatically labeled, as negative because they are outside of a predefined box in the caudal region of the CT volume, where all rectal tubes of the training data have been found to reside.

The remaining locations are clustered together by computing connected components in a graph. There is an edge between two locations if they are less than a given distance D apart. For each cluster or connected component of the graph, the bounding box is computed and enlarged by D on each side. The corresponding sub-volume is cropped and the tube segmentation algorithm that will be described below is used in the sub volume. This way, candidate locations that are clustered together will be processed at the same time. Any location that is closer than some distance K from the segmented tube is labeled as "RT" and the rest as "non-RT".

Figure 2:
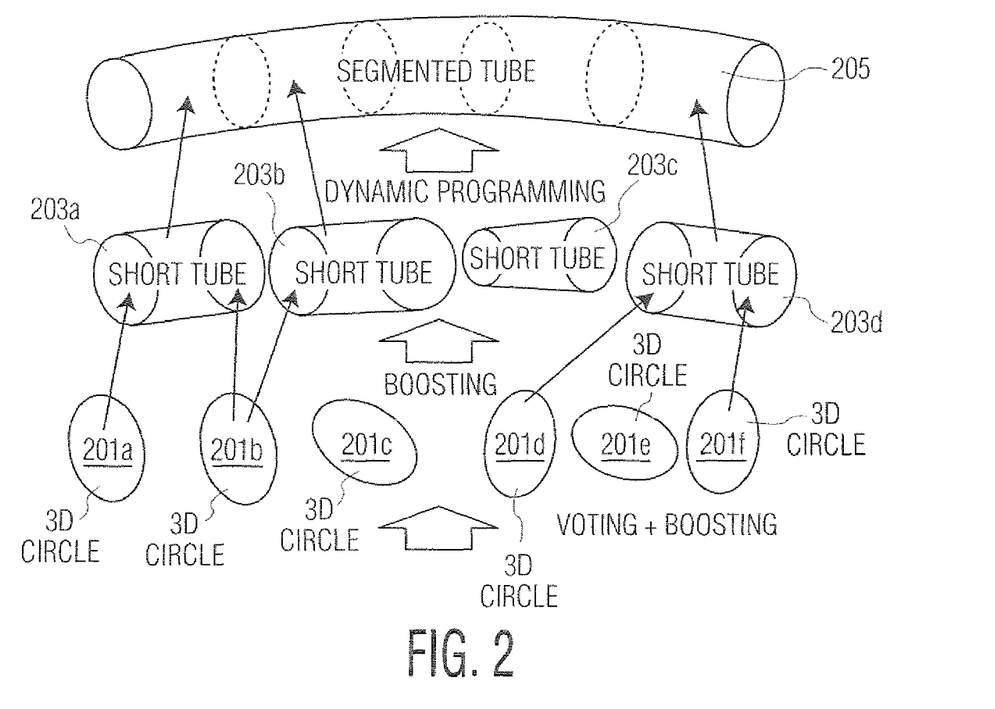
FIG. 2 illustrates a hierarchical, model for detecting a three dimensional flexible tubular structure in accordance with the present invention.

Using a trained classifier to detect rectal tubes provides a convenient way to manage the generalization power and the false positive rate of the system. The price to pay is the computational expense to search for all possible parameters that define the classifier. It is practically impossible to detect the entire rectal tube using a single classifier, because there are too many parameters to search since the tube is flexible. Instead, a part-based approach is used that starts with simpler and more rigid shapes and gradually increases the complexity of the shapes until the entire flexible tube is detected. FIG. 2 illustrates a hierarchical model of the learning based method used to detect 3D flexible tubular structures.

Figure 3:
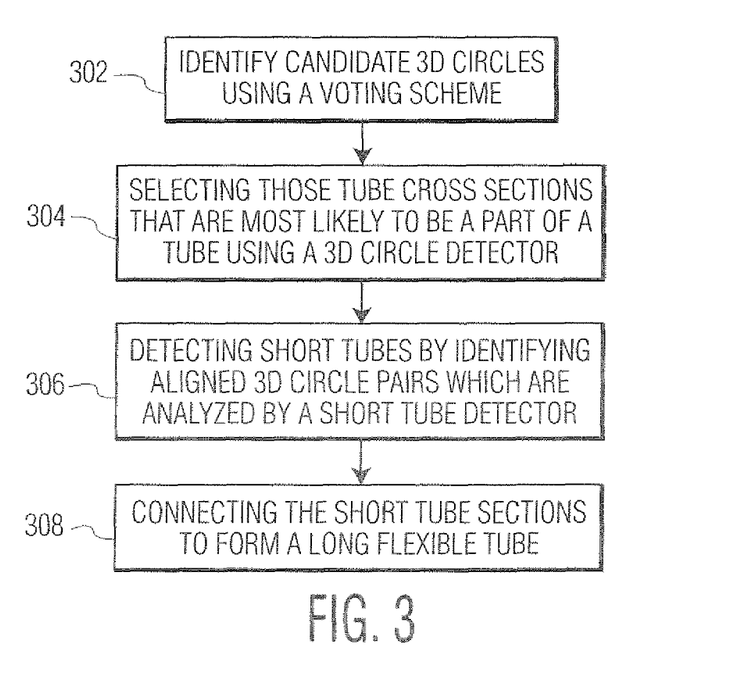
FIG. 3 illustrates a flow chart that depicts the method for detecting and segments a 3D freeform flexible tube in accordance with the present invention.

As shown in FIGS. 2 and 3, a parts based approach is used which starts with simpler and more rigid shapes, in this case tube cross sections 201a-201f (steps 302, 304), which are then connected to form short tubes 203a-203d (step 304) and connected again to form a long free-form lube 205 (step 306). To detect the tube cross sections (also referred to as 3D circles), ideally the trained detector would be applied to all possible locations $X=(x, y, z)$, directions $D=(d_x, d_y, d_z)$ and radii R, which is computationally prohibitive. Instead, the application of the detector is restricted to promising locations by using a voting strategy which will be described in detail hereinafter.

As indicated, candidate tube cross-sections or 3D circles having parameters $C=(X, D, R)$ in which X=location, D=direction and R=Radius, are found using a voting scheme. Inside a cropped sub-volume, the gradient at all locations is computed. At the places where the gradient is larger than a predefined threshold, the 3D curvatures and the principal directions of the curvature are computed.

Figure 4:
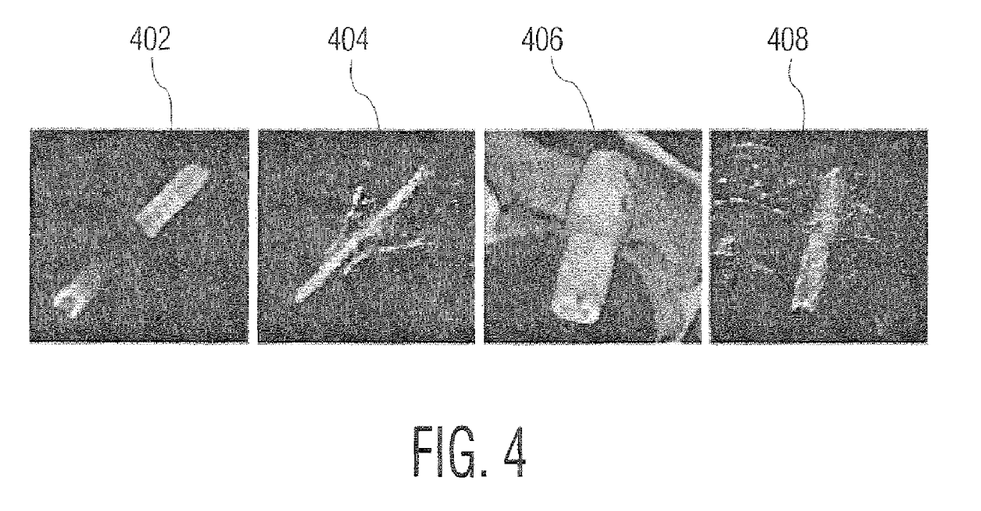
FIG. 4 illustrates how the voting strategy provides possible locations for the axes of the detected tubes.

The voting proceeds as follows. Each voxel x casts one vote at the location $v(x)$ in the direction of the gradient $g_x$ at a distance equal to the inverse of the largest curvature $k(x)$. That is, the vote is casted at location $$v(x) = x + \frac{g_x}{|g_x|} \frac{1}{k(x)}.$$

For a tubular structure, all locations on a tube cross-section will vote the center of the cross-section. The votes for two input tubes are shown in FIG. 4 with the white areas representing 5 votes. At locations y having at least 5 votes, the tube direction is computed as the median of the second principal directions at locations x that voted y·i.e., $v(x)=y$. In that direction, the most promising 3D circles $C_y(R)$ are obtained by computing the voting number:

$$N_y(R)=|\{x \in C_y(R), 0.5 \leq R^*k(x) \leq 2\}|/|C_y(R)| \qquad (1)$$

for some discretization of $C_y(R)$. For a perfect tube of radius R and y on its axis, all $x \in C_y(R)$ would have curvature $k(x)=1/R$ and the voting number $N_y(R)$ would be π. For practical reasons, all candidate circles $C_y(R)$ having $N_y(R) \geq 1.3$ are kept.

Figure 5:
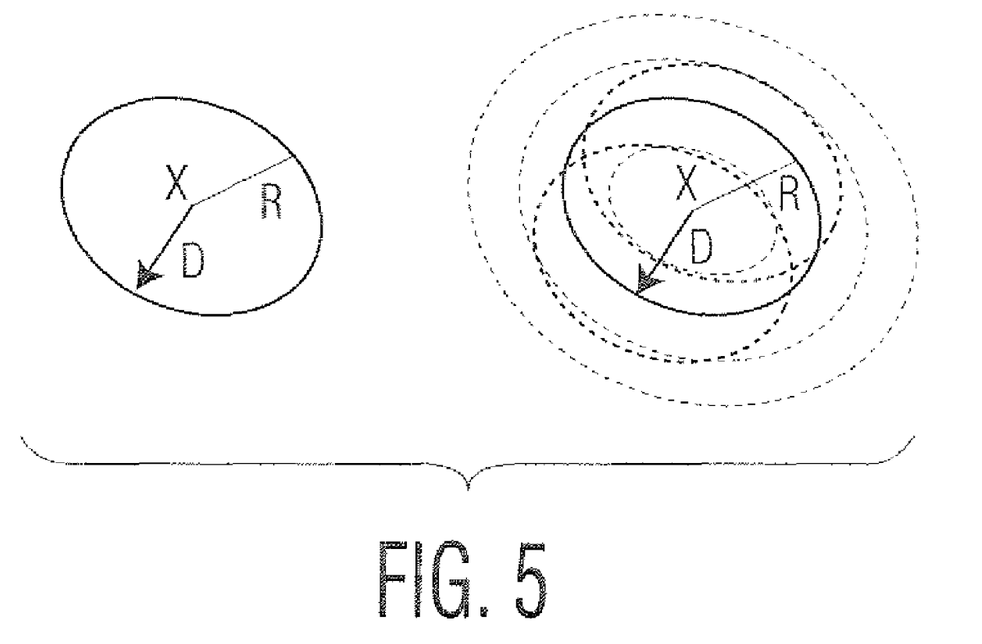
FIG. 5 illustrates a model of a 3D circle and its parameters.

The 3D circle detector is specialized in detecting cross-sections of the flexible tube. The parameters of a 3D circle are shown in FIG. 5. The parameters include the center location $X=(x, y, z)$, the direction $D=(d_x, d_y, d_z), |D|=1$, that is normal to the plane of the 3D circle and the radius R of the circle. The features of the 3D circle are computed using 12 circles (3 locations and 4 radii) that are relative to the 3D circle.

To avoid overfitting the data, all the features are invariant to rotation about the 3D circle axis. The features are obtained as 8 types of axial invariant statistics: mean, variance, central symmetry mean, central symmetry variance, 25, 50 and 75 percentile and voting number. Each invariant statistic is computed on one of the 12 circles having one of the 4 radii (R/3, R, 5/3 R, 7/3 R) and one of 3 locations along the circle direction (X and X±2D). Each of the 12 circles is discretized and subsampled and one of the 8 types of statistics is computed for one of 70 different combinations of gradient, curvature and principal directions (sum, difference, product, etc.). In total there are 6720 features.

Figure 6:
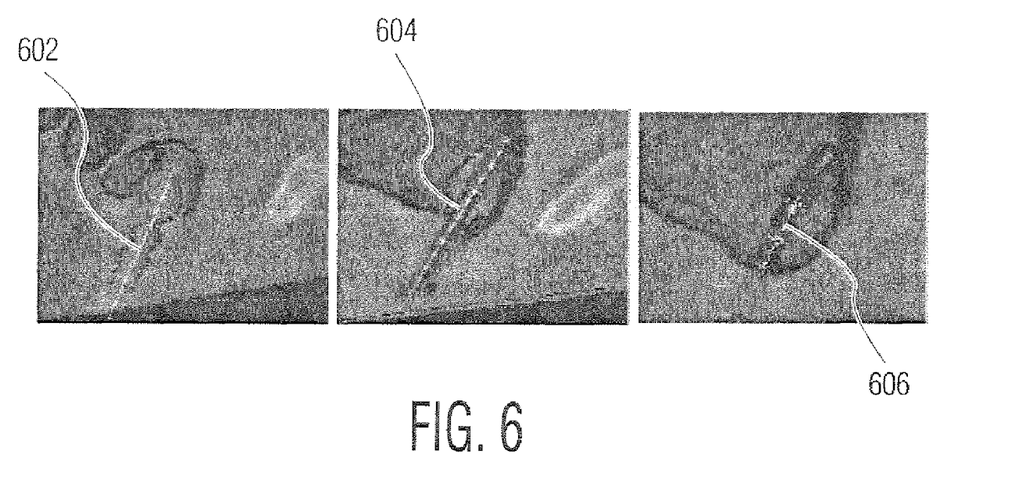
FIG. 6 illustrates manual annotations of different types of rectal tubes.

For training, the rectal tubes of 154 CT volumes are annotated using a generalized cylinder model. There are 3 different types of tubes in the training data. A semi-automatic algorithm based on dynamic programming is used to compute a tube annotation given two manually marked endpoints. The algorithm produces circle sections of the tube spaced 10 voxels apart, starting from one endpoint of the tube and ending in the other endpoint. The circle locations and radii are manually corrected to obtain the best alignment possible. The annotations 602, 604, 606 of three volumes are shown in FIG. 6.

An example of how the 3D circle detector can be trained will now be described. For training of the 3D circle detector, 15,000 positive examples are generated from the manual annotations by interpolation, excluding the region close to the tip of the tube where there are lateral holes. From the candidate locations obtained by voting 207,000 samples that are at a distance of at least 35 voxels from the tube annotations are chosen as negative examples.

The training algorithm is a Probabilistic Boosting Tree (PBT) that learns a binary tree of strong classifiers, where each node is trained by Adaboost starting from the root. The PBT method is described in detail in co-pending patent application Ser. No. 11/366,722, filed Mar. 2, 2006 and entitled "Probabilistic Boosting Tree Framework for Learning Discriminative Models", which is incorporated by reference in its entirety. The PBT is a method to learn a binary tree from positive and negative samples and to assign a probability to any given sample by integrating the responses from the tree nodes. Each node of the tree is a strong classifier boosted from a number of weak, classifiers or features. The PBT is a very powerful and flexible approach that is easy to train and to control against overfitting.

At each node, after training, the positives and negatives are run through the detector of that, node and the detected positives and false alarms are passed as positives and negatives for the right subtree, while the rejected positives and negatives are passed as training data for the left subtree. After training, the PBT can assign a probability to any new sample, representing the learned probability that the new sample is a positive example. A PBT with 6 levels is trained using 15 weak classifiers per node with the first two levels enforced as a cascade. The detection rate on the training samples was 95.6% and the false positive rate was 1.7%. The 3D circle detector usually misses the part of the tube that is not circular due to lateral holes in the tube. This is corrected by the short tube detector.

The short tubes are the parts from which the dynamic programming method (i.e., long tube detector which is described hereinafter) constructs the final segmentation. For good performance, there should be approximately the same number of short tubes starting at each of the detected circles. For that, the short tubes are detected in two steps. In the first step, 10 candidate tubes are found on each side of any detected 3D circle. For each 3D circle $C_1=(X_1,D_1,R_1)$, the 10 neighbor circles $C_2=(X_2,D_2,R_2)$ with the smallest alignment cost $A(C_1,C_2)$ are found. The alignment cost depends on the relative position of the circles, and their radii as shown in FIGS. 7a and 7b.

Figure 7A:
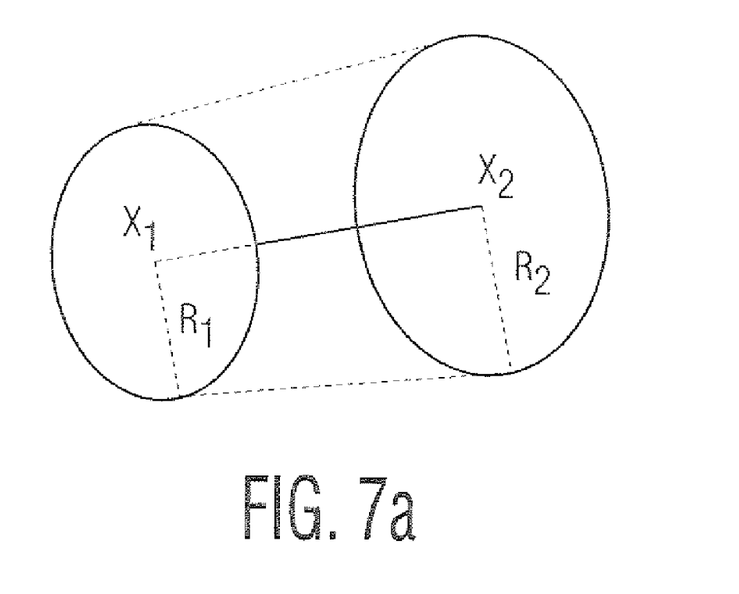
FIGS. 7a and 7b illustrate the parameters of a short tube and how a short tube is constructed from a pair of aligned 3D circles.
Figure 7B:
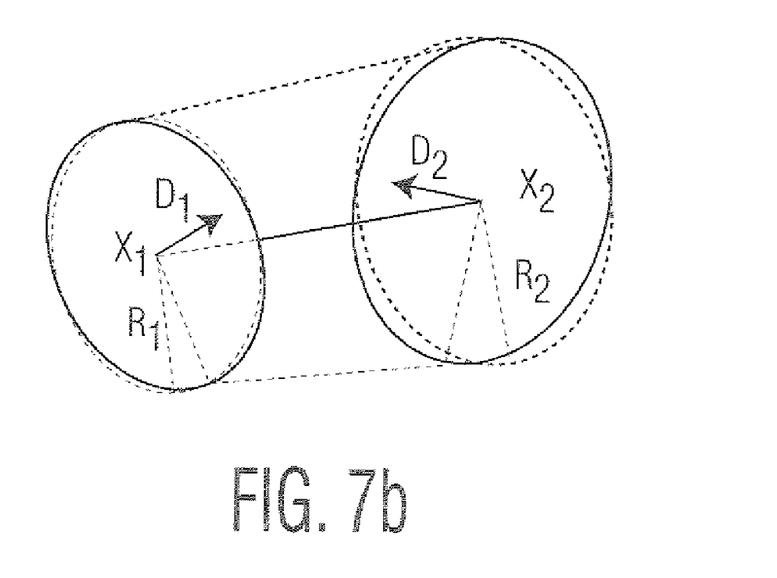

FIG. 7a shows the parameters of a short tube. FIG. 7b shows for a given pair of aligned 3D circles $C_1=(X_1,D_1,R_1)$, $C_2=(X_2,D_2,R_2)$ a short tube $T=(X_1,X_2,R_1,R_2)$ is constructed. The alignment cost can be defined as follows:

$$A(C_1,C_2)=\alpha^2+\beta^2+0.1(d-10)^2+0.2(R_1-R_2)^2-0.5(R_1+R_2) \quad (2)$$

where $\alpha,\beta<\pi/2$ are the angles between the axis $\overline{X_1X_2}$ and $D_1$ and $D_2$ respectively. This way, the preferred circles $C_2$ are those which are best aligned in direction, have similar and large radii, and are at a distance close to 10 voxels.

The parameters of a short tube are $T=(X_1,R_1,X_2,R_2)$. For each pair of aligned 3D circles $C_1=(X_1,D_1,R_1),C_2=(X_2,D_2,R_2)$ found as above, a candidate short tube is constructed, with parameters $T=(X_1,R_1,X_2,R_2)$, using only the radii and positions of the 3D circles, as illustrated in FIGS. 7a and 7b.

The second step validates the constructed short tubes using the input data. For that, a short tube detector is trained and only those short tubes are kept whose probability is greater than a threshold. The short tube detector has the same features as the 3D circle detector, with the difference that the 12 circles on which the feature statistics are computed have positions $X_1,(X_1+X_2)/2$ and $X_2$ and radii $R/3, R, 5/3R, 7/3R$ with $R=R_1$, $(R_1+R_2)/2,R_2$ respectively.

An example of a training set will now be described. For training 13,700 positive examples 10 voxels long were created from the manually annotated images. In addition, 40,000 negative examples were obtained at locations, directions and radii obtained by voting, all of which were of length 10 and of identical radii $R_1=R_2$. Another 9000 negative examples were obtained from aligned pairs of 3D circles that are at least 35 voxels away from the manual annotations. A PBT is trained with 6, levels, 20 weak classifiers per node, and the first two levels enforced as a cascade. The detection rate on the training samples was 95.1% and the false positive rate was 3.6%.

From the short tube detector a set of short lubes $T=\{T_1,\ldots,T_n\}$ and a graph $G=(T,E)$ are obtained whose nodes are the short tubes T. Two short tubes $T_i$ and $T_j$ are connected through a graph edge $E_{ij} \in E$ if they share one endpoint X and the have the same radius R at that endpoint, e.g., $T_i=(A,R_1,X,R)$ and $T_j=(X,R,B,R_2)$. All edges $E_{ij}$ for which the 3D angle $\alpha_{ij}=AXB$ is not close to $\pi$, (i.e., $\alpha_{ij}<5\pi/6$ or $\alpha_{ij}>7\pi/6$) are removed. The weight of the edge is a measure of good continuation of the tubes:

$$E_{ij}=|\alpha_{ij}-\pi||\tan|\alpha_{ij}-\pi| \quad (3)$$

There is also a unary cost for each short tube $T=(X_1,R_1,X_2,R_2)$:

$$c(T)=-ln(P(T))+0.2(R_2-R_1)^2 \quad (4)$$

where P(T) is the probability given by the trained short tube classifier.

In this dynamic programming framework, $C_{ij}^k$ denotes the cost of the best of a chain of k short tubes starting with $T_i$ and ending in $T_j$. This results in the following recurrence formula:

$$C_{ij}^{k+1} = \min_s [C_{is}^k + E_{sj} + c(T_j)] \quad (5)$$

Figure 8:
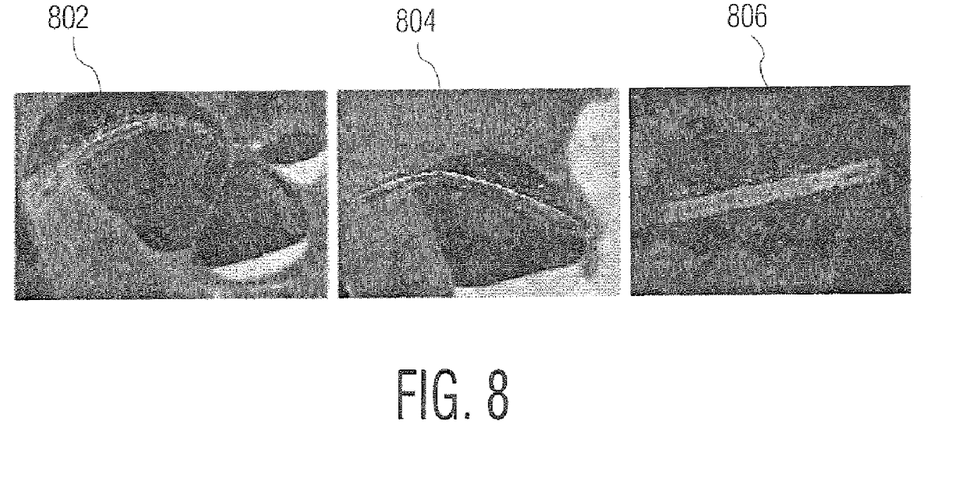
FIG. 8 illustrates some examples of segmentation results in accordance with the present invention.

For each k, the chain of short tubes $S_k$ is found that corresponds to the smallest $C_{ij}^k$. The chain $S_k$ with the largest length (in voxels) is the segmentation result. Some examples of segmentation results 802-806 are shown in FIG. 8.

Having described embodiments for a method for detecting and tracking a flexible tube in an object, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for populating a database with a set of image sequences of an object, the database being used to detect a tubular structure in the object, the method comprising the steps of:
   receiving a set of images of objects, each image being annotated to show a tubular structure;
   for each given image:
   using a Probabilistic Boosting Tree (PBT) to detect three dimensional (3D) circles;
   constructing short tubes from pairs of approximately aligned 3D circles;
   using a discriminative joint shape and appearance model to classify each short tube;
   constructing a long flexible tube by connecting all of the short tubes;
   identifying a tubular structure model that comprises a start point, end point and the long flexible tube; and
   storing the tubular structure model in the database.

2. The method of claim 1 wherein 3D circles are selected based upon a voting strategy.

3. The method of claim 1 wherein the step of constructing short tubes from pairs of approximately aligned 3D circles further comprises the steps of:
   identifying a predetermined number of candidate tubes on each side of the detected 3D circle;
   pairing each candidate tube with the detected 3D circle;
   determining a likelihood probability for each pair; and
   maintaining those pairs whose probability is above a predetermined value.

4. The method of claim 1 wherein the object is an anatomical structure.

5. The method of claim 4 wherein the anatomical structure is a colon.

6. The method of claim 5 wherein the tubular structure is a rectal tube.

7. A system for detecting a tubular structure in an object captured in an image sequence, the system comprising:
   a database that stores a set of image sequences of objects, each image being annotated to show a tubular structure;

a processor that receives an input image sequence of an object, the processor performing the following steps on each image in the image sequence:

using a Probabilistic Boosting Tree (PBT) to detect 3D circles in the image;

constructing short tubes from the 3D circles;

using a discriminative joint shape and appearance model to classify each short tube;

constructing a long flexible tube by connecting all of the short tubes;

identifying a tubular structure model that comprises a start point, end point and the long flexible tube;

storing the tubular structure model in the database; and a display to display the tubular structure in the object.

8. The system of claim 7 wherein 3D circles are selected based upon a voting strategy.

9. The system of claim 7 wherein the step of constructing short tubes from pairs of approximately aligned 3D circles further comprises the steps of:

identifying a predetermined number of candidate tubes on each side of the detected 3D circle;

pairing each candidate tube with the detected 3D circle;

determining a likelihood probability for each pair; and maintaining those pairs whose probability is above a predetermined value.

10. The system of claim 7 wherein the object is an anatomical structure.

11. The system of claim 10 wherein the anatomical structure is a colon.

12. The system of claim 11 wherein the tubular structure is a rectal tube.

* * * * *